United States Patent
Jakob et al.

(10) Patent No.: US 9,276,499 B2
(45) Date of Patent: Mar. 1, 2016

(54) PROCEDURES FOR THE OPERATION OF AN ELECTRICAL CIRCUIT

(71) Applicant: GE Energy Power Conversion GmbH, Berlin (DE)

(72) Inventors: Roland Jakob, Berlin (DE); Piotr Sadowski, Berlin (DE)

(73) Assignee: GE Energy Power Conversion GMBH, Berlin (DE)

(*) Notice: Subject to any disclaimer, the term of this patent is extended or adjusted under 35 U.S.C. 154(b) by 304 days.

(21) Appl. No.: 13/865,535

(22) Filed: Apr. 18, 2013

(65) Prior Publication Data

US 2013/0301325 A1    Nov. 14, 2013

(30) Foreign Application Priority Data

Apr. 18, 2012 (DE) .................. 10 2012 206 409

(51) Int. Cl.
- *H02M 7/537* (2006.01)
- *H02M 7/797* (2006.01)
- *H02M 7/487* (2007.01)
- *H02P 27/08* (2006.01)

(52) U.S. Cl.
CPC .............. *H02M 7/797* (2013.01); *H02M 7/487* (2013.01); *H02P 27/08* (2013.01)

(58) Field of Classification Search
CPC .............................. H02M 7/797; H02M 7/487
USPC ................................ 363/95, 97, 98, 131, 132
See application file for complete search history.

(56) References Cited

U.S. PATENT DOCUMENTS

| | | | |
|---|---|---|---|
| 7,978,488 B2 * | 7/2011 | Tanaka et al. | 363/141 |
| 2010/0315776 A1 | 12/2010 | Ono et al. | |
| 2012/0019178 A1 * | 1/2012 | Kono et al. | 318/400.3 |

FOREIGN PATENT DOCUMENTS

| | | |
|---|---|---|
| DE | 195 27 178 C1 | 11/1996 |
| DE | 196 48 948 C1 | 3/1998 |
| DE | 10 2012 206 409 A1 | 10/2013 |

OTHER PUBLICATIONS

German Patent Office Search Report, Feb. 21, 2013.

\* cited by examiner

*Primary Examiner* — Matthew Nguyen
(74) *Attorney, Agent, or Firm* — Parks Wood LLC

(57) ABSTRACT

A method for operating an electrical circuit is described. The electrical circuit is equipped with a power converter (10) that has at least one series connection (11, 12, 13) consisting of at least four power semiconductor elements. The electrical circuit is equipped with at least one capacitor (Cd1, Cd2) connected in parallel to the series connection (11, 12, 13). In the power converter (10), at least one resistor has been connected in parallel to the middle two power semiconductor elements. In the method, at least one of the power semiconductor elements is conductively connected and in this way a discharging current is generated from the capacitor (Cd1, Cd2) through the conductively connected power semiconductor element and the resistor.

10 Claims, 2 Drawing Sheets

PROCEDURES FOR THE OPERATION OF AN ELECTRICAL CIRCUIT

Figure 1:
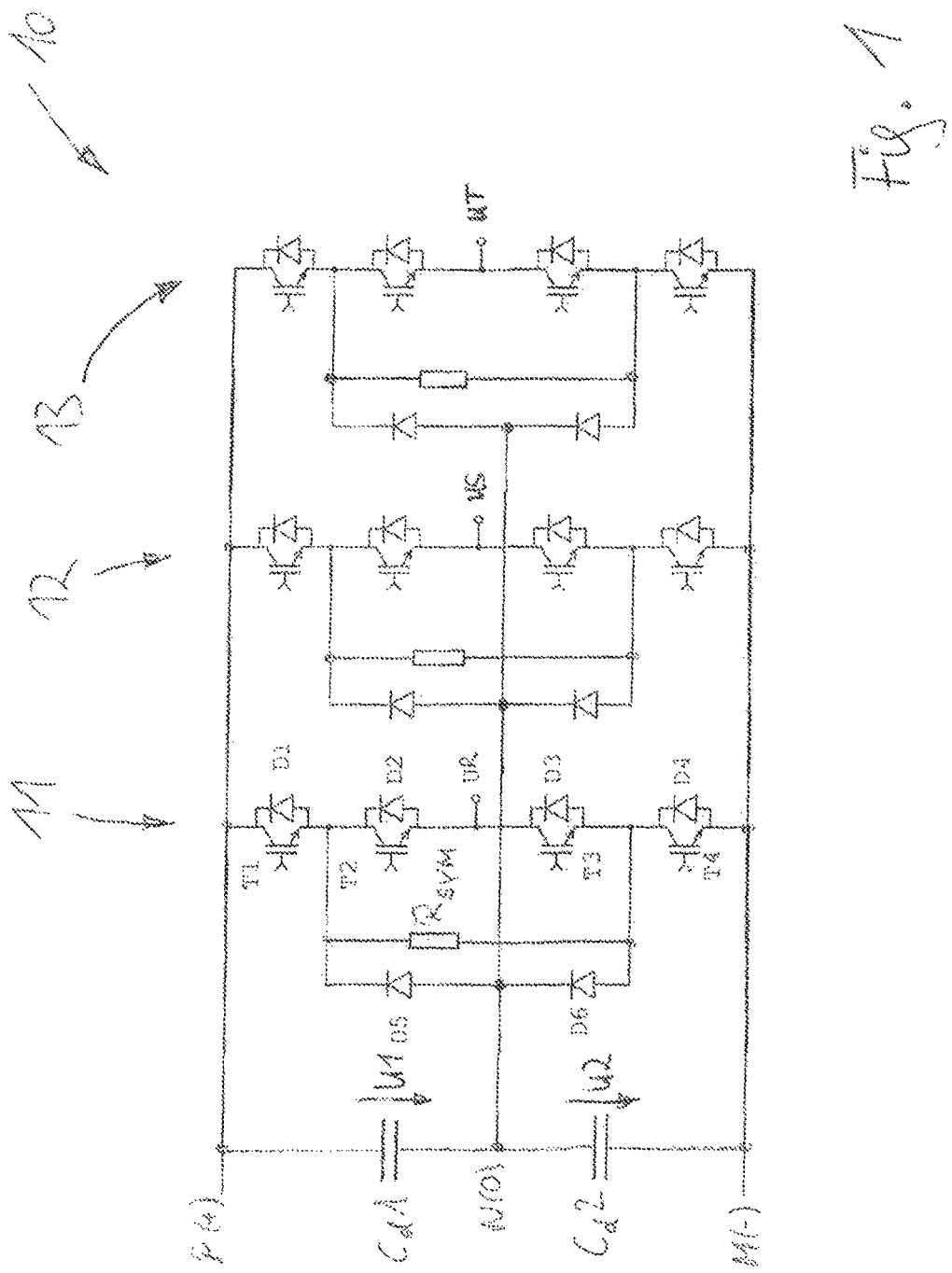

The invention refers to a method for operating an electrical circuit, a control device for such an electrical circuit and a corresponding electrical circuit with a power converter.

An electrical circuit is known where a power converter and an intermediate circuit capacitor are connected in parallel. When the circuit is operating, the capacitor is supplied with DC voltage, which is converted to three-phase AC voltage by the power converter. The capacitor is a series connection consisting of a discharge resistor and a discharge switch connected in parallel. When the capacitor should be discharged—in other words, when the operation of the electrical circuit should be interrupted—the discharge resistor is conductively connected and the intermediate circuit capacitor discharges through the discharge resistor.

Obviously, the discharge resistor and the discharge switch are necessary for discharging the intermediate circuit capacitor.

So-called NPC three-point power converters (NPC=neutral point clamped) are known, for example, from DE 198 29 856 A1.

The task of the invention is to create an electrical circuit in which less effort is needed for discharging an intermediate circuit capacitor.

The invention solves this task with a method according to claim 1, with a control device according to claim 5. and with an electrical circuit according to claim 6.

The electrical circuit is equipped with a power converter that has at least one series connection consisting of at least four power semiconductor elements. The electrical circuit is provided with at least one capacitor connected in parallel to the series connection. At least one resistor is connected in parallel to the middle two power semiconductor elements. At least one of the power semiconductor elements is conductively connected and a discharging current is generated in this way from the capacitor through the conductively connected power semiconductor element and the resistor.

Therefore, the at least one conductively connected power semiconductor element creates a discharge circuit with the resistor or resistors. Irrespective of the number of resistors, it is not necessary to include here an additional discharge switch for the conductive switching of the discharge circuit in the electrical circuit according to the invention.

Therefore, compared to the state of the art, the advantage of the invention consists in that no separate discharge switch is necessary for discharging the intermediate circuit capacitor, but that at least one of the existing power semiconductor elements of the power converter is used instead for guiding the discharging current out of the intermediate circuit capacitor. Thus, it is possible to do without the discharge switch available from the state of the art and reduce overall expense.

Another possible advantage of the invention is that the existing separate discharge resistor available from the state of the art can be done without. This is especially the case when a resistor already provided in the power converter is used as discharge resistor.

Therefore, it is advantageous to provide a so-called balancing resistor connected in parallel to the two middle power semiconductor elements. Such a balancing resistor is provided to limit voltage in the two middle power semiconductor elements of the power converter. By using this balancing resistor as discharge resistor, it is possible to do without the separate discharge resistor available from the state of the art and reduce expenses even more.

The question of which power semiconductor element(s) is/are conductively connected for generating a discharging current depends on how the power converter is designed.

Thus, in an advantageous further development of the invention, the two external power semiconductor elements are conductively connected to generate a discharging current from the capacitor through the two external power semiconductor elements and the resistor.

In another advantageous further development of the invention, in which two capacitors connected in series are provided and two diodes are connected in parallel in opposite direction to the two middle power semiconductor elements whose connecting point is connected to the connecting point of the two capacitors, one of the two external power semiconductor elements is conductively connected to generate a discharging current from one of the two capacitors through the conductively connected power semiconductor element, the resistor and one of the two diodes.

In case the power converter does not only have four, but six power semiconductor elements connected in series, for example, then it is also possible to generate a discharging current through a discharge resistor connected in parallel by the corresponding conductive switching of one or several of the power semiconductor elements. When doing this, the discharge resistor can be a balancing resistor already present in the power converter.

Further characteristics, application possibilities and advantages of the invention result from the description of the invention's embodiments given below, which are shown in the associated figures. All characteristics described or shown constitute, either by themselves or in any combination, the object of the invention, irrespective of their summary in the patent claims or reference made to them and regardless of their formulation or representation in the description or in the figures.

Figure 2:
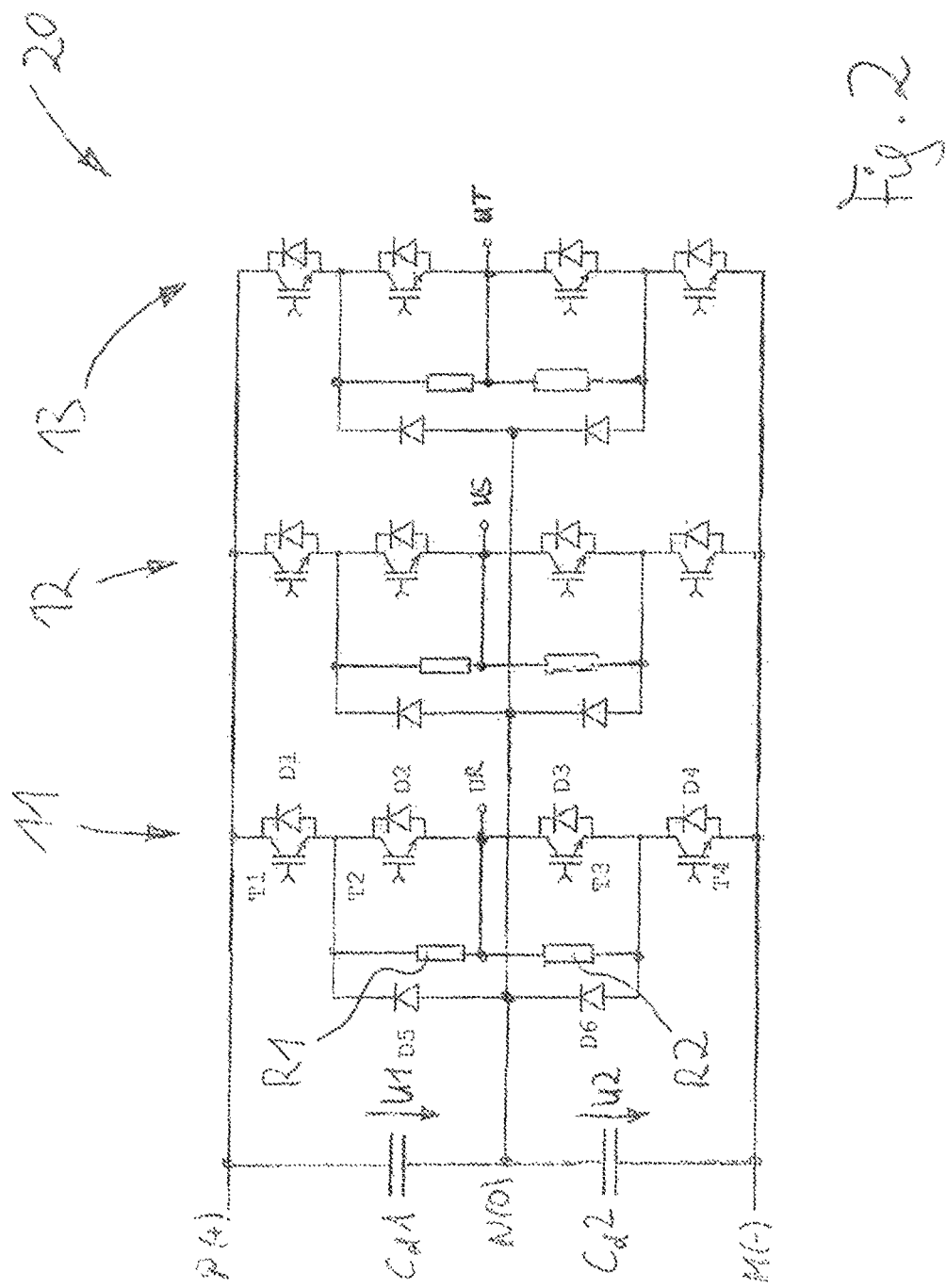

FIG. 1 shows a schematic diagram of a circuit of a first embodiment of an electrical circuit according to the invention and FIG. 2 shows a schematic diagram of a circuit of a second embodiment of an electrical circuit according to the invention.

FIG. 1 shows a power converter 10 that has been provided for converting DC voltage to AC voltage or vice versa. In this embodiment, the power converter 10 has a three-phase design, but this power converter 10 could also have another phase number. In the example shown, the power converter 10 is a three-phase power converter, in particular a so-called three-level NPC power converter (NPC=neutral point clamped), but it is understood that another number of phases could also be provided for the power converter 10. Likewise, the power converter 10 could have another type of circuit design.

The power converter 10 has a first series connection 11 that consists of four IGBTs T1, T2, T3 and T4 (IGBT=insulated gate bipolar transistors), each one consisting of fly-back diodes D1, D2, D3 and D4 connected in parallel in opposite direction. Two diodes D5 and D6 are connected in series to the two middle IGBTs T2 and T3 in opposite direction. Moreover, a resistor has been connected in parallel to the two middle IGBTs T2 and T3. This resistor can especially be a so-called balancing resistor Rsym.

It must be pointed out that the power converter 10 could also have other power semi-conductor elements, for example thyristors (particularly GTO (gate turn off) thyristors) or the like instead of the IGBTs.

The series connection 11 is connected to a P(+) connection for a positive potential and to an M(−) connection for a negative potential. The connecting point of the two diodes D5 and D6 is connected to an N(0) connection for a zero potential. The connecting point of the two middle IGBTs T2 and T3 forms a UR connection for AC voltage.

The power converter 10 has a second series connection 12 and a third series connection 13 designed in the same way as the first series connection 11. The three series connections 11, 12 and 13 are connected parallel to one another. In the second series connection 12, the connecting point of the two middle IGBTs forms a connection US for AC voltage and in the third series connection 13 the connecting point of the two middle IGBTs located there forms a converter connection for AC voltage.

A first capacitor Cd1 is arranged between the P(+) connection for a positive potential and the N(0) connection for a zero potential, and a second capacitor Cd2 is arranged between the N(0) connection for a zero potential and the M(−) connection for a negative potential. The two capacitors Cd1 and Cd2 constitute a so-called intermediate circuit.

It must be pointed out that—at least with regard to the methods explained below for discharging the two capacitors Cd1 and Cd2 possibly only one single capacitor can be arranged between the two external P(+) and M(−) connections, which will then constitute the intermediate circuit.

If the power converter 10 is operated as inverter, for example, then a first DC voltage U1 is present in the first capacitor Cd1 and a second DC voltage U2 is present in the second capacitor Cd2. Not shown here is a voltage source that supplies power to capacitors Cd1 and Cd2, thereby largely generating and maintaining the two DC voltages U1 and U2. This voltage source can be, for example, an energy supply network coupled to the two capacitors Cd1 and Cd2 through a rectifier.

If the power converter 10 is operated as inverter, as assumed above, then the IGBTs of the three series connections 11, 12 and 13 are driven in such a way by a control device that a three-phase AC voltage Urst can be tapped in the three connections UR. US and UT. To achieve this, the control device continuously blocks and conductively connects the IGBTs of the three series connections. The DC voltages U1 and U2 applied on the two capacitors Cd1 and Cd2 are in this way converted to the AC voltage Urst by the power converter 10. This AC voltage Urst can, for example, supply a load, which can be a driving motor or the like.

As explained above, a resistor is located in every one of the three series connections 11, 12 and 13 of the power converter 10. In this embodiment, the resistor is a so-called balancing resistor Rsym, provided for limiting voltage on the two middle IGBTs T2 and T3.

If, for example, the two IGBTs T1 and T2 block and the two IGBTs T3 and T4 are conductively connected, then the sum of the two DC voltages U1 and U2 (the so-called intermediate circuit voltage) is applied on the two IGBTs T1 and T2. If furthermore, owing to component tolerances or the like, for example, the voltage dropping on the IGBT T2 is considerably larger than the voltage dropping on the IGBT T1, then it is possible—without the balancing resistor Rsym for a voltage to be applied on the IGBT T2 that exceeds a given value, for example one-half of the intermediate circuit voltage.

However, if the balancing resistor Rsym is present, then the voltage applied on the IGBT T2 can be limited to the one-half of the intermediate circuit voltage mentioned above as an example. This results from the fact that in the case described here—i.e. when the two IGBTs T1 and T2 block and the two IGBTs T3 and T4 are conductively connected—the balancing resistor Rsym and the IGBT T2 form a parallel circuit and that by correspondingly selecting the resistor value of the balancing resistor Rsym, it is possible to limit the voltage applied on this parallel circuit to a desired value, for example to one-half of the intermediate circuit voltage.

It is expressly pointed out that the resistor connected in parallel to the two middle IGBTs T3 and T4 does not necessarily have to be the balancing resistor Rsym explained above. It is also possible for the resistor to exist for another purpose or only provided for the purpose explained below, i.e. only for discharging the two capacitors Cd1 and Cd2 in accordance with the method described below.

If the operation of the power converter 10 is interrupted or ceased, then no more energy is supplied any longer to the two capacitors Cd1 and Cd2. The two capacitors Cd1 and Cd2 are now discharged according to at least one of the following methods.

The two IGBTs T1 and T4 are conductively connected and the two IGBTs T2 and T3 are blocked. The balancing resistor Rsym is then conductively connected in parallel to the two capacitors Cd1 and Cd2 so a discharging current can flow through both IGBTs T1 and T4 and the balancing resistor Rsym.

At least the IGBT T1 is conductively connected and the two IGBTs T3 and T4 are blocked. The balancing resistor Rsym is then connected in parallel to the first capacitor Cd1 through the diode D6. This allows a discharging current to flow out of the first capacitor Cd1 through the IGBT T1, the balancing resistor Rsym and the diode D6.

At least the IGBT is conductively connected and the two IGBTs T1 and T2 are blocked. The balancing resistor Rsym is then connected in parallel to the second capacitor Cd2 through the diode D5. This allows a discharging current to flow from the second capacitor Cd2 through the diode D5, the balancing resistor Rsym and the IGBT T4.

It is obvious that the discharging of the capacitors Cd1 and Cd2 can take place individually through every one of the three series connections 11, 12 and 13 of the power converter 10. Needless to say, the discharging can also take place through two or all three connections in series at the same time.

It is furthermore obvious that in the last two methods described, the first capacitor Cd1 is initially discharged for a given amount of time and then the second capacitor Cd2 for a given amount of time. Naturally, the first capacitor Cd1 can be fully discharged first, followed by the full discharge of the second capacitor Cd2.

if the two capacitors Cd1 and Cd2 are connected to an energy supply grid through a second power converter and the AC voltage Urst of the power converter 10 supplies a load and while doing so the second power converter has largely the same design as the power converter 10 mentioned above, then in the two options last described one of the two capacitors Cd1 or Cd2 can be discharged via the load-side power converter 10, for example, while the other one of the two capacitors Cd2, Cd1 can be discharged via the grid-side second power converter.

It is obvious that the methods explained above for discharging the capacitors of the intermediate circuit can also be used with power converters that have more than three stages.

If, for example, there is a five-stage power converter with eight IGBTs connected in series for every phase, for example, then it is possible to connect the four middle IGBTs to a discharging resistor. In this case, the four outer IGBTs can be conductively connected for generating in this way a discharge current from the capacitor(s) through the four conducting IGBTs arid the discharging resistor. If need be, the discharging resistor can be a balancing resistor already existing in the power converter or a resistor already existing in the power converter for other reasons.

FIG. 2 shows a power converter 20 provided for converting DC voltage to AC voltage or vice versa. The power converter 20 of FIG. 2 corresponds largely to the power converter 10 of FIG. 1. For this reason, matching components have been indicated with matching reference characters in FIGS. 1 & 2. In view of the design and functioning of the power converter 20 shown in FIG. 2, reference is made to the explanations given for power converter 10 of FIG. 1.

The only difference between the two power converters consists in the fact that in all three phases, the respective balancing resistor Rsym of the power converter 10 shown in FIG. 1 has been replaced in the power converter 20 of FIG. 2 by the two resistors R1 and R2 connected in series and in every phase the connecting point of these two resistors R1 and R2 is in each case connected with the connecting point of the two associated IGBTs T3 and T4.

The two resistors R1 and R2 of each phase can be balancing resistors, but not necessarily.

Accordingly, as has already been explained by means of FIG. 1, a discharging circuit can be set up for the power converter 20 of FIG. 2 with the help of at least one of the IGBTs through at least one of the resistors R1 and R2 so the capacitors Cd1 and Cd2 can be discharged. Owing to the existence of two capacitors R1 and R2, more discharging circuits are possible or conceivable if necessary in FIG. 2 than in FIG. 1.

The invention claimed is:

1. A power converter circuit, comprising:
    a first branch including at least four semiconductor elements disposed in series;
    an intermediate circuit including at least two capacitors having in common a zero- potential node;
    at least one resistor disposed in parallel with two consecutive semiconductor elements in the first branch; and
    a second branch configured to provide a path from the at least one resistor to the zero-potential node;
    wherein at least one semiconductor element in the first branch is configured to operate in a conduction mode to provide a discharging current at the at least one capacitor;
    wherein the at least one resistor is configured to limit a voltage across at least one other semiconductor element in the first branch.

2. The power converter circuit of claim 1, wherein the voltage across the at least one other semiconductor element in the first branch is obtained based on a voltage across the intermediate circuit and a value of the at least one resistor.

3. The power converter circuit of claim 1, further comprising at least one other branch having the same architecture as the first branch.

4. The power converter circuit of claim 3, wherein one other branch has at least one other resistor disposed in parallel with two consecutive semiconductor elements included in the one other branch.

5. The circuit of claim 1, comprising no separate discharging switch for discharging the at least two capacitors.

6. The power converter circuit of claim 1, wherein the first branch is disposed between a positive terminal and a negative terminal of the power converter circuit.

7. The power converter circuit of claim 1, wherein the second branch includes at least two diodes.

8. The power converter circuit of claim 1, wherein the at least one resistor is a balancing resistor.

9. The power converter circuit of claim 1, further comprising two other branches like the first branch.

10. The power converter circuit of claim 1, wherein each of the semiconductor elements in the first branch is an insulated gate bipolar transistor (IGBT).

\* \* \* \* \*